Aug. 8, 1967    E. C. RHYNE, JR    3,335,356
CONTROL CIRCUIT FOR POWER RECTIFYING SYSTEMS
Filed Jan. 30, 1964    4 Sheets-Sheet 1

Aug. 8, 1967  E. C. RHYNE, JR  3,335,356
CONTROL CIRCUIT FOR POWER RECTIFYING SYSTEMS
Filed Jan. 30, 1964  4 Sheets-Sheet 3

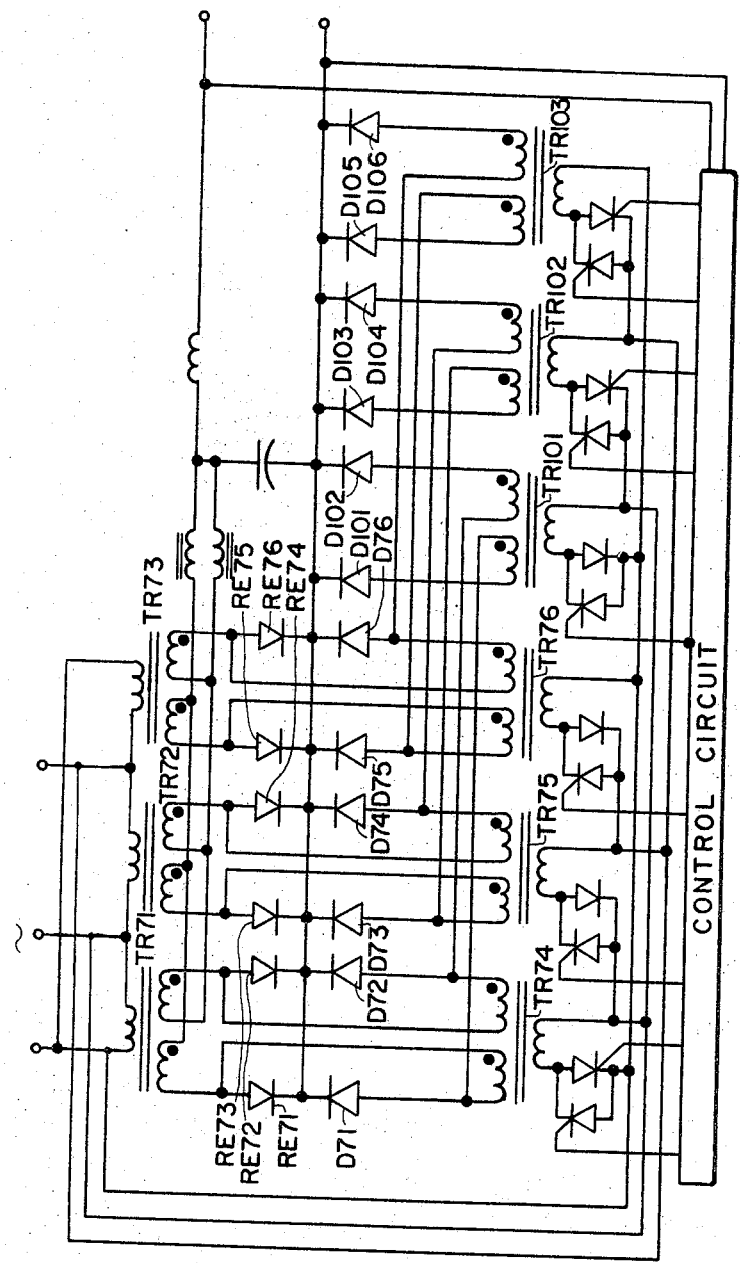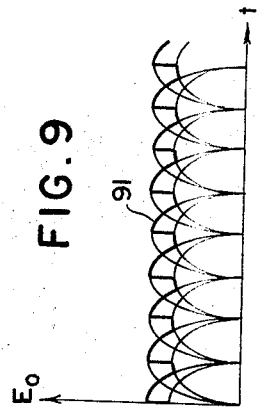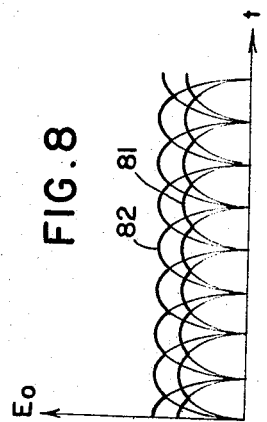

United States Patent Office 3,335,356
Patented Aug. 8, 1967

3,335,356
CONTROL CIRCUIT FOR POWER RECTIFYING SYSTEMS
Earl C. Rhyne, Jr., Millis, Mass., assignor to Dielectric Products Engineering Co., Inc., having a division, Warren Manufacturing Company, Littleton, Mass., a corporation of Michigan
Filed Jan. 30, 1964, Ser. No. 341,263
10 Claims. (Cl. 321—16)

My invention relates to power rectifiers, and particularly but not exclusively to high-efficiency solid-state regulated power supplies of large current capacities.

In solid-state power-rectifying systems the current carrying capacity of the individual solid-state components has limited the total current delivery capacity of the system. This current delivery capacity cannot simply be multiplied by connecting a number of solid-state devices in parallel because the characteristics of like components may vary. Thus one of two components, which have been connected in parallel to carry twice the current may carry a greater proportion of the total current than the other component and thus pass beyond its own current-carrying capacity. Failure of this heavy-current carrying component will then impose an even heavier burden on the remaining parallel components and result in further damage to these components and perhaps the entire system.

Silicon controlled rectifiers (SCR's) have high current-carrying capacities. They will permit a forward voltage at their extreme main electrodes to initiate a current flow therein only after an intermediate gate electrode has a firing voltage applied thereto, and once current has been initiated and the SCR "fired", the gate loses control of the current which is determined by the voltage applied to the main electrodes. Thus the action of the SCR's is similar to that of a thyratron or ignitron. However, because current is initiated suddenly after forward voltage has been applied to the SCR's, the voltage output produced is heavy in low harmonics. Also SCR's of large current carrying capacities are rather expensive.

As a further disadvantage, the efficiencies of the ordinary rectifying system using ignitrons, thyratrons, SCR's as rectifying members, are quite low since firing of the rectifying members during each half-cycle constitutes essentially a phase shift which has an adverse effect on the power factor.

An object of my invention is to provide generally an improved power rectifying system.

Another object of my invention is to provide a highly efficient high-current output rectifying system, which preferably is capable of being connected in parallel with another rectifying system so as to share the load equally therewith or in any desired proportion.

Still another object of the invention is to provide a control system for a regulated power rectifier wherein the individual semiconductor members which control the total output current, or regulate the same, need not have a current-carrying capacity comparable to the current output of the system. More particularly, it is desired to control a high-current output system by means of low-current rated silicon controlled rectifiers.

Still another object of the invention is to provide a system having extremely good power factor characteristics. In this regard it is also an object to reduce the losses inherent in the system to a hitherto unattainable value.

Still another object of this invention is to provide a rectifying system whose output voltage requires less filtering than that hitherto required by similar systems and yet produce a filtered output voltage having better or as good characteristics as those that have hitherto been obtained.

Another object of the invention is to provide a rectifying system wherein several portions share the load current in a desired proportion and which uses controllable solid-state devices (SCR's) having ratings far below the current rating of any one of the portions.

According to a feature of my invention, in a power supply, I rectify the current applied to the supply only with simple and inexpensive diode rectifiers of the non-controllable type and apply across each rectifier a direct voltage, for example by means of an energized transformer in series with a diode, of such polarity that each tends to force reverse current through the rectifier across which it is connected. I further provide regulating means, such as an SCR, to vary the value of the direct voltage. Thus, when the direct voltage is applied, the current which would normally flow through each diode rectifier to the load is suppressed by the applied direct voltage, and is forced to follow the path of least resistance through the source of the direct voltage, i.e. through the transformer windings and the diode, to the load. Thus, the momentary value of the direct voltage is added to the momentary voltage which is being rectified.

If the SCR's suppress the direct voltage, the combined voltage output is the same as it would have been in the absence of the voltage. However, once the silicon controlled rectifiers have permitted the direct voltage to be applied, the momentary output voltage is equal to the sum of these two voltages. This condition lasts up to one-half cycle. Since the output voltage at firing varies between two finite values, the resulting output voltage than exhibits a curve which is far less distorted than if the rectifiers in the rectifying system had been controlled directly. As a further feature of the invention, I control the direct voltage means, for example, by triggering the SCR's connected thereto, in response to the voltage output of the rectifying system.

Since the output voltage is but little distored from the rectified sinusoidal output voltage, it can be more easily filtered.

These and other features of the invention are pointed out in the claims forming part of this specification. Other objects and advantages of the invention will become obvious from the following detailed description when read in light of the accompanying drawings. However, it will be obvious to those skilled in the art that the invention may be embodied otherwise than hereinafter described without departing from its spirit and scope.

In the drawings:

FIGS. 8 and 9 are graphs illustrating the operation of the system in FIG. 7;

FIG. 10 is a circuit diagram of still another power rectifying system embodying features of the invention.

Figure 1:
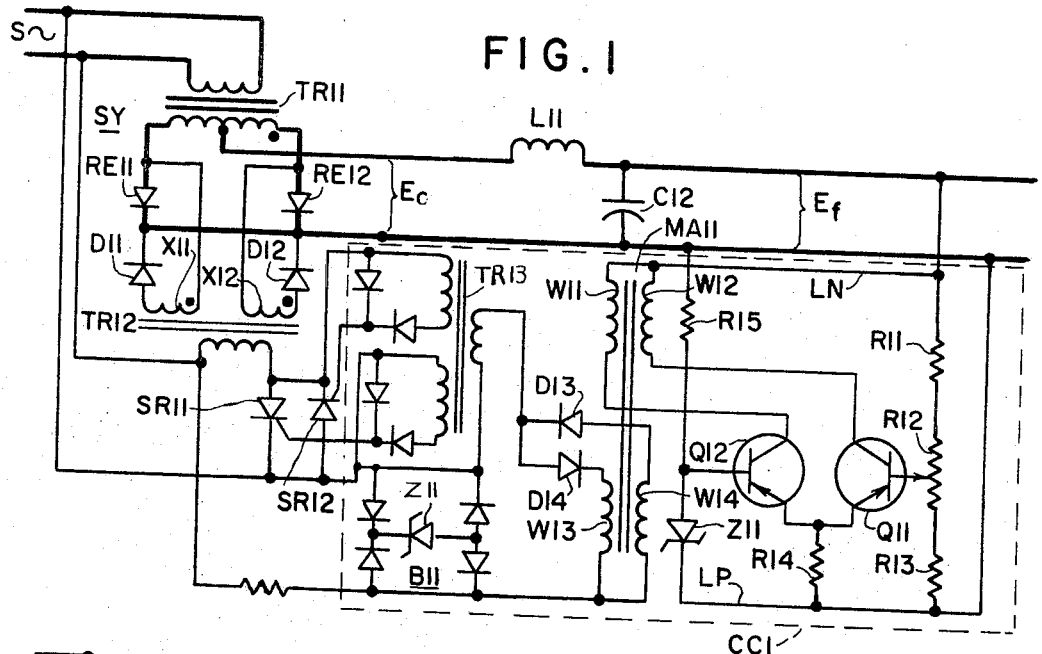
FIG. 1 is a schematic diagram of a circuit of a rectifying system embodying features of the invention.
Figure 2:
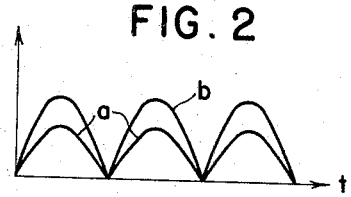
FIGS. 2 and 3 are voltage-time curves illustrating the operation of the circuit in FIG. 1.

In FIG. 1, a sinusoidal source S energizes a single-phase full-wave power rectifying system SY comprising a transformer TR11 and two rectifiers RE11 and RE12. The output of $E_o$ of the rectifier is a normal full-wave rectified voltage as illustrated by the curve $a$ in FIG. 2. A filter composed of elements L11 and C12 filter the output $E_o$ to produce a DC voltage $E_f$.

In FIG. 1, the source S also energizes the primary of a transformer TR12 through a pair of parallel-connected oppositely-poled (anti-parallel) silicon controlled rectifiers SR11 and SR12. When energized, a secondary winding X11 on the transformer TR12, by virtue of its winding direction and the polarity of a diode D11 through which it is connected, imposes a mementary voltage across the rectifier RE11, which voltage opposes the forward current in the rectifier. This voltage is then added to the voltage produced by the secondary winding of the transformer TR11. Another secondary winding X12 on the transformer TR12 by virtue of its winding direction and the polarity of a series diode D12, imposes a voltage across the diode RE12, which voltage opposes the forward current in the rectifier RE12. This establishes a momentary voltage in series with the voltage produced by the secondary of transformer TR11.

If the SCR's SR11 and SR12 are not fired at all, no voltages appear at windings X11 and X12 and the output $E_o$ of the rectifying system SY is unaffected. It appears prior to filtering, as a voltage $E_o$ having a curve corresponding to $a$ in FIG. 2. If the SCR's are ignited at the beginning of each half-cycle, the voltage appearing at the secondary windings X11 and X12 are effective to raise the momentary voltages appearing across the terminals $E_o$ and produce an output corresponding to the curve $b$.

If the SCR's are fired at intermediate phase, the output voltage appearing at $E_o$ follows the curve $a$ until ignition occurs and then follows the curve $b$. The composite voltage curve thus established by firing the SCR's at intermediate times, for example at 80° after the start of each half-cycle, is illustrated by the curve $c$ in FIG. 3.

Control of the gates of the SCR's SR11 and SR12 is established by a control circuit CC1 whose input is connected across the filtered output $E_f$ of the rectifier. The control circuit CC1 comprises two differential amplifier connected transistors Q11 and Q12 having a common emitter-resistor R14 connected to a positive input line LP. A Zener diode Z11, which is charged to its constant potential by a resistor R15 connected to a negative input line, establishes a constant voltage relative to the positive line at the base of transistor Q12. The base of transistor Q11 compares the voltage across the Zener diode with a voltage corresponding to the filtered output voltage $E_f$ and established by a voltage divider comprising resistors R11, R12 and R13. Control windings W11 and W12 of a magnetic amplifier MA11 connect the respective collectors of transistors Q11 and Q12 to the negative input line LN. When the base voltages of transistor Q11 and Q12 are equal, the currents through the last mentioned windings W11 and W12 are equal. When the voltage at transistor Q11 is above or below the voltage across the Zener diode Z11, the current in one of the windings rises and the current in the other of the windings drops.

Two operating windings W13 and W14 of the self-saturating type, on the magnetic amplifier MA11, are energized from the source S across a clipping bridge B11 through the primary winding on a transformer TR13. The windings W13 and W14 exhibit a high impedance until the iron in the magnetic amplifier is saturated by the combined effect of the currents through the windings W11, W12, W13 and W14. Then they exhibit a low impedance and the voltages thereacross suddenly collapse. The impedance returns to its high value at the end of each half cycle of voltage from source S, when the magnetic field in the core of MA11 reverses. After the impedance of windings W13 and W14 has collapsed in each half cycle the voltage from source S appears mainly across the transformer TR13 which applies it to fire the SRC's SR11 and SR12. The bridge B11 clips the voltage applied to transformer TR13 by a value determined by the Zener diode Z11. Within each half cycle the application of voltage to the SCR's is stopped after a predetermined interval by saturation of the transformer core in TR13. However, the SCR's continue to conduct for the remainder of each half cycle after they have been rendered conductive. This conduction depends upon the value of the filtered output voltage $E_f$ which controls circuit CC1. In this manner, a predetermined output voltage $E_o$ and $E_f$ can be obtained.

The circuit operates as follows. An output voltage $E_o$ is established at the output of the main rectifier composed of the elements TR11, RE11 and RE12. When the SRC's SR11 and SR12 are not fired, the transformer TR12 has no effect upon the output voltage, and the output $E_o$ follows a path defined by curve $a$ in FIG 2.

If the SCR's are fired continuously, the voltages applied to the transformer TR12 produce voltages in the windings X11 and X12, whose winding directions are indicated by the dots.

These voltages are applied through the diodes D11 and D12 across the recifiers RE11 and RE12. Thus the positive current attempting to flow through the rectifier RE12 due to the voltages in the transformer TR11 encounters this new voltage from the winding X12 which attempts to force current through RE12 in the reverse direction. Of course, this is not possible. However, the current taking the path of least resistance passes from the dotted side of the secondary winding in transformer TR11 through the winding X12 to the diode D12 and the output terminals $E_o$ and back to the center tap of the secondary winding of TR11. On the opposite half-cycle, the same occurs in the rectifier RE11 with winding X11 and diode D11. The voltages during each half-cycle in the windings X11 and X12 are thus added to the voltages in the respective halves of the secondary winding in transformer TR11.

Figure 3:
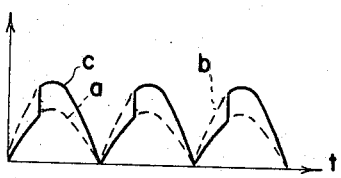

If now the SCR's first are not triggered for a portion of the half-cycle and then are triggered during a portion of the half-cycle, the output $E_o$ will follow the curve $c$ in FIG. 3.

It will be seen that the output voltage (curve $c$) despite control by the firing of the SCR's, has a wave form during each half-cycle which almost corresponds to the unregulated full-wave rectified wave form. In fact, two conditions of control, when the SCR's are fully off for a full half-cycle and fully on for a full half-cycle, produce simple rectified sinusoidal outputs corresponding to the curves $a$ and $b$ in FIG. 2.

If the SCR's had been used as rectifiers, the ignition at any points in the half-cycle would have distorted the sinusoidal character of each half-wave quite a bit more. Moreover, the average phase shift resulting from the use of SCR's as rectifier members would have been far greater than indicated by the curve $c$ in FIG. 3. This has an important effect upon the power factor, and in a system requiring high efficiency produces extremely favorable results. This is particularly so, since, as mentioned previously, there are two conditions of nearly sinusoidal half-wave current output and thus two conditions of close to ideal power factor.

When the transformer TR12 is completely cut off by the SCR's, another great advantage occurs. In this case, the transformer exhibits no core loss, since no current passes therethrough, and no $I^2R$ loss. This is even more important in systems where high efficiency is necessary. It is made possible by the diodes D11 and D12 which essentially cut off the transformer TR12 from the transformer TR11.

Another very important advantage of the circuit according to FIG. 1 resides in the fact that the SCR's SR11 and SR12 need only be rated to carry a sufficient current to provide the extra voltage between the curve $a$ and the curve $b$. This advantage is of great importance since high current SCR's are quite expensive, whereas high-current rectifiers such as RE11, RE12 or diodes D11 and D12 are almost one-twentieth of the cost of SCR's.

Figure 4:
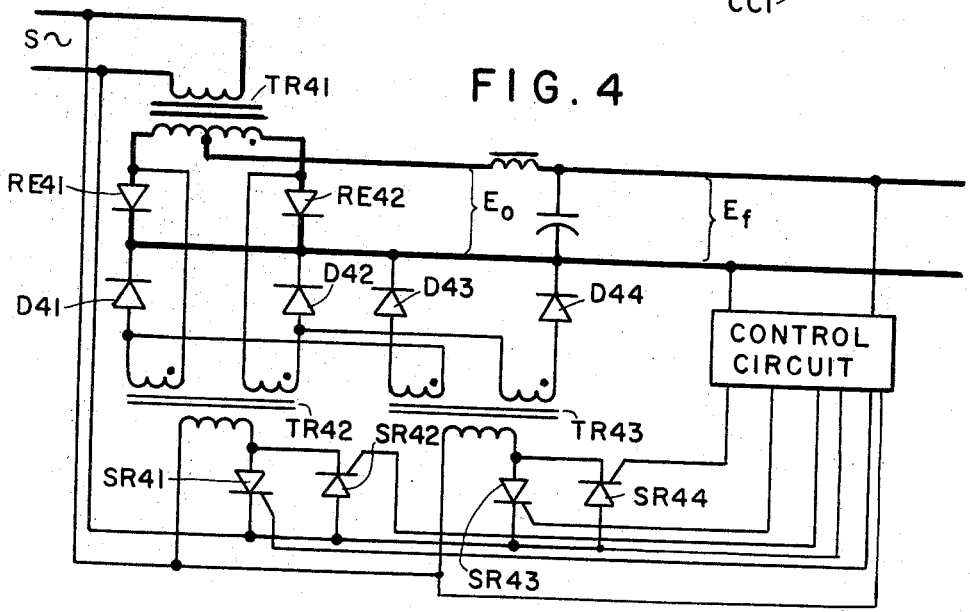
FIG. 4 is a circuit of another rectifier system also embodying features of the invention.

The conditions of close to maximum power factor or sinusoidal rectified output wave forms at $E_o$ can be increased for an even further range of control. This is shown in the circuit of FIG. 4. Here the power circuit composed of members TR41, RE41 and RE42 corresponds to the power circuit of FIG. 1. The supplementary voltages applied in FIG. 1 by the windings TR12 are supplied by the transformer TR42 coupled with the diodes D41 and D42. Here current is controlled by the SCR's SR41 and SR42. However, in FIG. 4 a third transformer TR43 is also energized through SCR's, namely SR43 and SR44, from the source S. Its secondary windings each have one diode D43 and D44, and each of the series circuits of a secondary winding and a diode is connected across a corresponding one of diodes D41 and D42. That is, the secondary winding connected in series with D43 is connected across the diode D41 and the secondary winding connected in series with D44 is connected across the diode D42.

Figure 5:
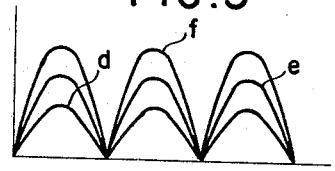
FIGS. 5 and 6 are sets of voltage-time curves illustrating the operation of the device in FIG. 4.

If the SCR's SR41, SR42, SR43 and SR44 are continuously off or non-conductive, the output voltage will be unaffected by the transformers TR42 and TR43 and will correspond to the curve $d$ in FIG. 5. This is comparable to the curve $a$ in FIG. 2. If only the SCR's SR41 and SR42 are operative, the effect would correspond to curve $e$ in FIG. 5 or curve $b$ in FIG. 2. If the SCR's SR41, SR42, SR43 and SR44 are continuously conductive, the voltage produced across the diode D43 in its secondary winding would be across the diode D41. This voltage would suppress current flow through the diode D41 and simply constitute an additional voltage across the diode D41, which voltage as shown by the dots would add to the voltage at the secondary winding of transformer TR42. Thus the voltage established by the secondary winding connected to diode D41 on transformer TR42, which had previously been added across the rectifier RE41, would be enhanced still further and the voltage output would correspond to the curve $f$ in FIG. 5. The same effect is provided at the other secondary winding, connected in series with the diode D44 across the diode D42.

Thus when positive current flows out of the dotted side of the secondary of transformer TR41, it passes through the secondary winding of transformer TR42, through the secondary winding of transformer TR43, through the diode D44, through the output terminals and back to the center tap of the secondary winding on transformer TR41. Similarly, current flows in the opposite direction from transformer TR41 to TR42 and TR43. Thus the voltages are effectively added to produce the curve $f$ in FIG. 5. A control circuit connects to the gates of the SCR's SR41, SR42, SR43 and SR44. The first half-cycle $g$ in FIG. 6 illustrates the effect of gating the SCR's SR41 and SR42 to be continuously conductive and gating the SCR's SR43 and SR44 on at approximately 80°.

Figure 6:
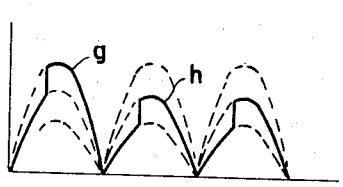

The second half-cycle in FIG. 6, shown by curve $h$, illustrates the effect of gating the SCR's SR43 and SR44 off while gating the SCR's SR41 and SR42 on at approximately 80°.

It is obvious here that there are three conditions where the output wave form $E_o$ corresponds to full-wave rectified sinusoidal output. The intermediate conditions are almost sinusoidal. The salutary effects described with respect to FIG. 1 are hereby increased even further. An additional advantage not heretofore mentioned resides in the fact that the amount of filtering which must be used to obtain a predetermined ripple either in FIG. 1 or in FIG. 4 may be far smaller than with earlier rectifying systems, because the lower harmonics here have been considerably suppressed.

Figure 7:
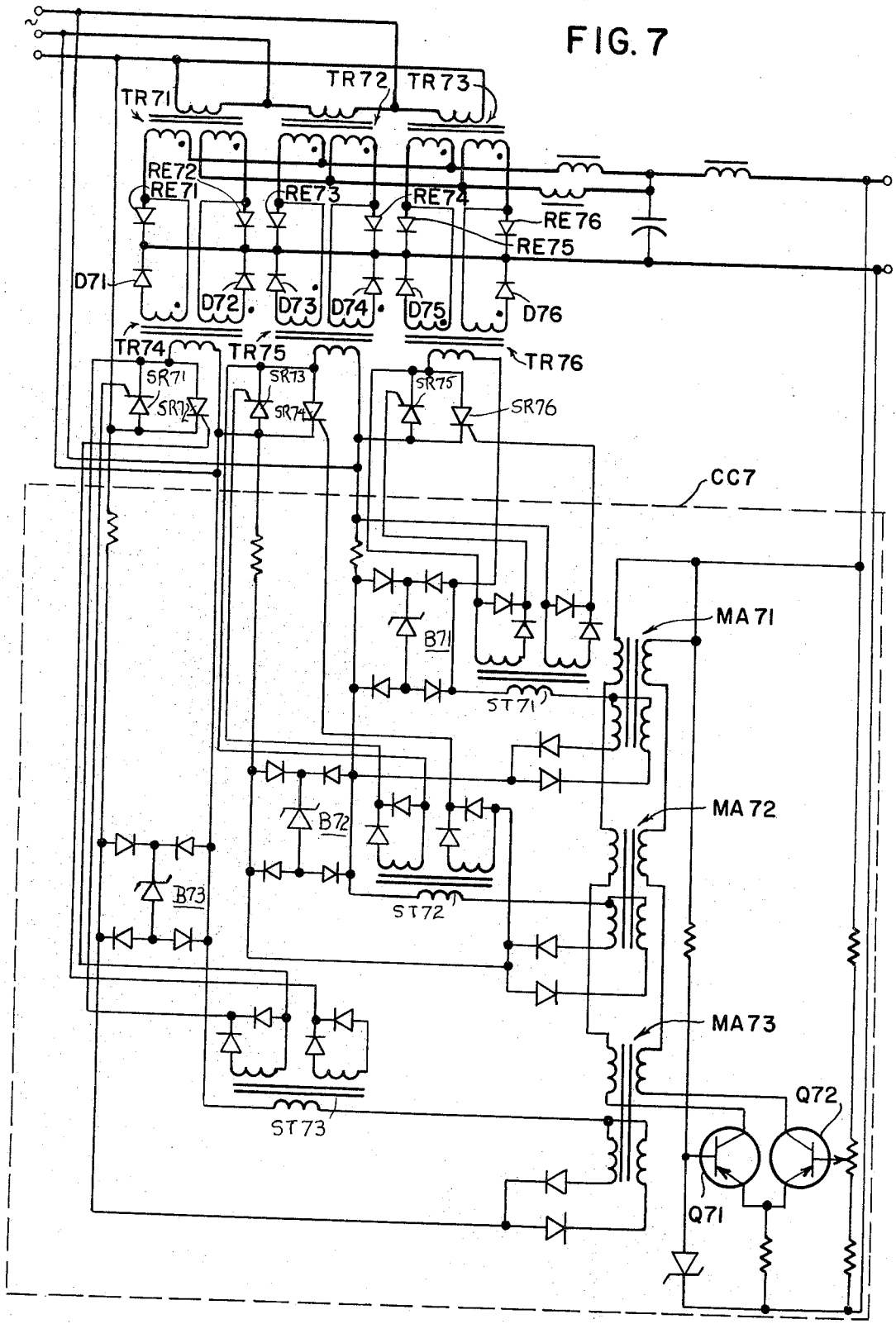
FIG. 7 is a circuit diagram showing another rectifier system embodying features of the invention.

FIG. 7 illustrates the principle of the invention as shown in FIG. 1 applied to a multi-phase circuit. Here the primaries of the power transformers TR71, TR72 and TR73 are delta-connected to a three-phase source. The secondary windings, forming three-phase double wye connections with interphase chokes, connect to the output through six rectifiers RE71, RE72, RE73, RE74, RE75 and RE76. Three supplemental transformers TR74, TR75, and TR76 are energized through respective antiparallel SCR circuits from the line. Diodes D71, D72, D73, D74, D75, and D76 in series with each pair of secondary windings in transformers TR74, TR75 and TR76 are connected across respective rectifiers in the power rectifier system and operate similarly to that described in FIG. 1. The output of this system is shown in FIG. 8 for various conditions of control of the SCR's. Such control is implemented in response to the filtered output voltage by means of control circuit CC7 forming the counterpart of the control circuit CC1. Here the transistors Q71 and Q72 correspond to the transistors Q11 and Q12. However, instead of a magnetic amplifier with a single pair of control windings as in FIG. 1, here three pairs of control windings are series connected. Three pairs of operating windings all connect separately through three saturable transformers ST71, ST72 and ST73 across limiting bridges B71, B72 and B73 which apply to the operating windings respective square waves. The square waves are derived from the source S7 across the primaries of transformers TR74, TR75, TR76. Upon saturation of the current in each of the operating windings due to the conditions established by the control windings, the voltages thereacross collapse and are applied across the transformers ST71, ST72 and ST73 to the gates of SCR's SR71, SR72, SR73, SR74, SR75 and SR76. When the SCR's are fully off, the output voltage corresponds to that available from the transformers TR71, TR72, TR73 only after rectification, as shown by the curve 81 in FIG. 8. The curve 82 shows the effect of the SCR's being fully on at all times.

The curve 91 in FIG. 9 illustrates the effect of control and firing of the SCR's at an intermediate angle for each phase.

FIG. 10 corresponds to FIG. 7, but differs therefrom in a manner similar to the difference between FIGS. 1 and 4. In FIG. 10, those members corresponding to members in FIG. 7 are designated as in FIG. 7. In FIG. 10, an additional set of transformers TR101, TR102 and TR103 supplements the first supplemental transformers TR74, TR75 and TR76 to produce output voltages even higher than those obtained in FIG. 7. Diodes D101 to D106 are connected in series circuits with the secondary windings of the transformers TR101, TR102 and TR103 and the series circuits are connected across the respective diodes D71, D72, D73, D74, D75 and D76 in a direction attempting to pass current in opposition to these last diodes so as to establish an even higher output voltage.

Figure 11:
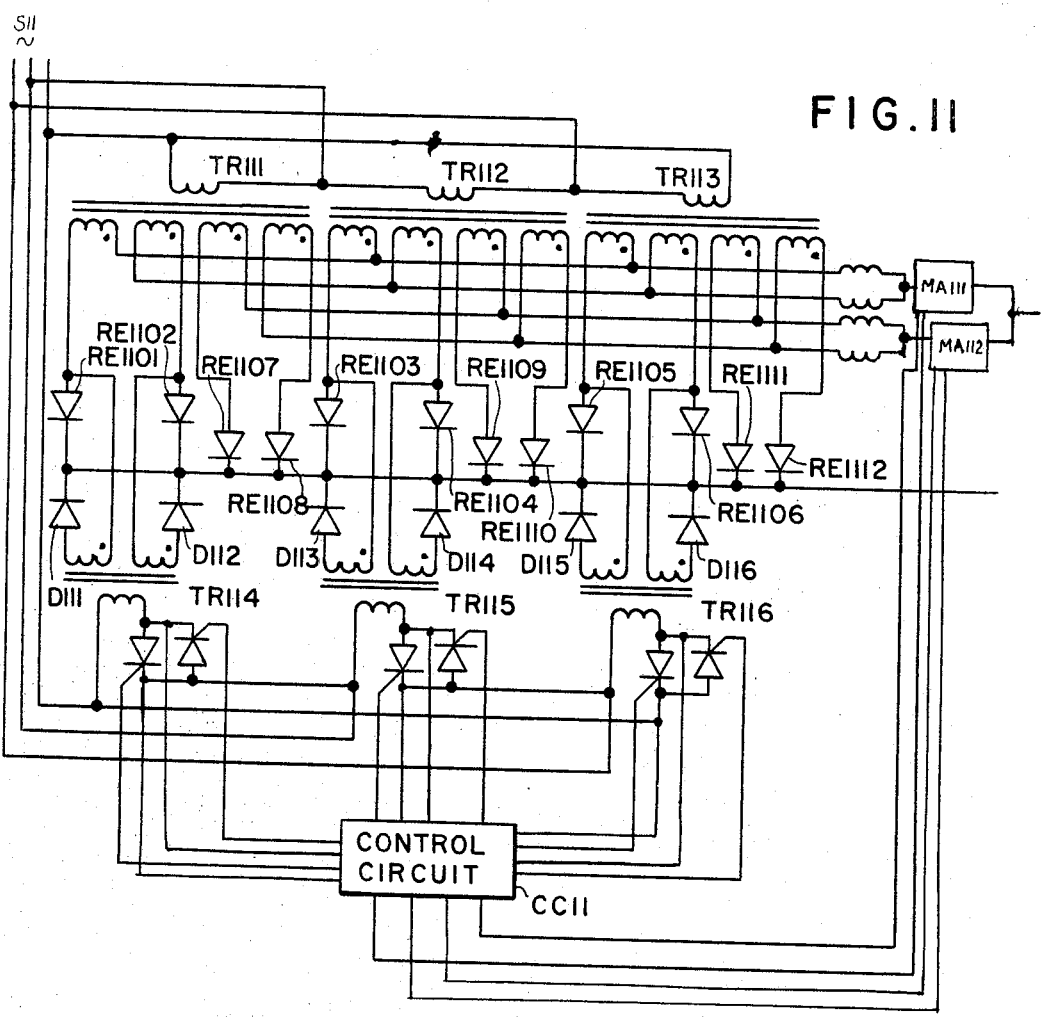
FIG. 11 is a circuit diagram of a load sharing system which is controlled according to features of the invention.

FIG. 11 illustrates an unregulated system whose output current is increased to twice the value of that available from the system in FIG. 7. Such high direct output currents may be desired in a telephone battery charging system which may require currents in the range of 800 or 1600 amperes. In such cases where two systems are connected parallel to each other, a slight voltage different at the output of the two systems causes large currents to flow between the systems at great losses in efficiency. Thus it is desired that the two systems operate at exactly the same output voltage. Ordinarily, it might be thought that the current capacity of any one system may be increased merely by enlarging the transformer windings and by increasing the current capacity of the respective diodes. However, the current-carrying capacity of ordinary diodes is also limited, and connecting two diodes in parallel with each other creates difficulties since the voltage drop across each diode may vary so that one diode may carry more current than the other. Thus, one of the diodes may carry more than its share of current, to its detriment, until it burns out.

In FIG. 11, three power transformers TR111, TR112, TR113 have their primary windings delta-connected to a three-phase source. Each transformer has two pairs of secondary windings. The first two pairs of secondary windings on each transformer are three-phase double wye connected with interphase chokes and have respective rectifiers RE1101 to RE1106 connected to the output. The second pair of windings on each transformer are also three-phase double wye connections with rectifiers having interphase chokes and output rectifiers RE1107 to RE1112. However, the first pair of secondary windings in each transformer has just slightly fewer turns than the second pair of transformer windings so that the voltage output at each of these windings is slightly less than at the windings in the other pair. Thus the output of the first system, that is the DC output, is slightly less than the DC output of the second system. Supplementing the direct current output of the first system are three supplemental transformers TR114, TR115 and TR116. Their primaries are delta-connected through respective anti-parallel pairs of SCR's to the voltage source S11. Each of the supplemental transformers possesses two secondary windings. Each secondary winding has a diode (D111 to D116) connected in series therewith with which it forms a direct voltage circuit. Each direct voltage circuit is connected across one of the rectifiers from the first pair of windings in the transformers TR111, TR112 and TR113, as shown. Thus the voltages of the transformers TR114, TR115 and TR116 are added to the voltages from the first pair of windings in the transformers TR111, TR112 and TR113. If the anti-parallel SCR circuits connected to each of the transformers TR114, TR115 and TR116 are on at all times, the output voltage of the rectifier circuit formed by the first pair of secondary windings on each of the power transformers TR111, TR112 and TR113 would be higher than the output voltage from the rectifier circuit of the other windings. However, the SCR's are controlled by a control circuit which fires them only in response to the current difference between the outputs of the first set of two-phase Y-connected split rectifier circuits and the other rectifier circuit. In this manner, the firing of each rectifier can be controlled to occur at exactly the right time at which equal voltages will be produced by the parallel systems. This minimizes the flow of current between the systems and produces a highly efficient output.

The invention, as will be noted, permits a large common heat sink for the like poles of all the rectifiers and diodes. Also it affords a fine control for large phase shifts in the firing times of the SCR's.

The aforementioned current difference is shown measured by DC current transformers MA111 and MA112 of the magnetic amplifier type.

I claim:
1. A circuit arrangement, comprising
   rectifying means having an input and an output;
   input means for applying an input voltage to the input of said rectifying means;
   output means for deriving an output voltage from the output of said rectifying means;
   voltage means for providing a voltage different from said input and output voltages;
   a diode connected in series circuit arrangement with said voltage means, said series circuit arrangement being connected across said rectifying means, said diode being connected with a polarity which opposes forward current flow in said rectifying means and the voltage provided by said voltage means having a polarity which opposes forward current flow in said rectifying means, such that the voltage developed therein has a polarity which opposes forward current flow in said rectifying means during the conducting half cycle of said rectifying means.

2. A circuit arrangement as claimed in claim 1, wherein said voltage means comprises variable voltage means for providing a variable voltage.

3. A circuit arrangement as claimed in claim 1, further comprising means coupled to said voltage means for controlling the magnitude of said voltage in accordance with said output voltage thereby controlling the magnitude of said output voltage.

4. A circuit arrangement as claimed in claim 1, wherein said voltage means comprises alternating voltage means for providing an alternating voltage.

5. A circuit arrangement as claimed in claim 1, further comprising transformer means having an input winding connected to said input means and a secondary winding comprising said winding, a silicon controlled rectifier connected in series with the input winding of said transformer means, said silicon controlled rectifier having a gate for controlling the conductive condition thereof, and control means having input means connected to said output means and output means connected to the gate of said silicon controlled rectifier for controlling the conductive condition of said silicon controlled rectifier thereby controlling the magnitude of said output voltage.

6. A circuit arrangement, comprising
   a full-wave rectifier having an input comprising a first transformer having an input winding and a secondary winding, an output and a plurality of rectifying means connected to the secondary winding of said first transformer;
   input means for applying an input voltage to the input winding of said first transformer;
   output means for deriving an output voltage from the output of said rectifier;
   a second transformer having an input winding connected to the input winding of said first transformer and a plurality of secondary windings; and
   a plurality of diodes each connected in series circuit arrangement with a corresponding one of said secondary windings, each of the series circuit arrangements being connected across a corresponding one of the rectifying means of said rectifier, each of said diodes being connected with a polarity which opposes forward current flow in the corresponding rectifying means and each of said secondary windings being wound in a manner such that the voltage developed therein has a polarity which opposes forward current flow in the corresponding rectifying means during the conducting half cycle of said rectifying means.

7. A circuit arrangement as claimed in claim 6, further comprising silicon controlled rectifier means connected in series with the input winding of said second transformer, said silicon controlled rectifier means having gate means for controlling the conductive condition thereof, and control means having input means connected to said output means and output means connected to the gate means of said silicon controlled rectifier means for controlling the conductive condition of said silicon controlled rectifier means in accordance with said output voltage thereby controlling the magnitude of said output voltage.

8. A circuit arrangement as claimed in claim 6, wherein said full-wave rectifier comprises a multiphase rectifier.

9. A circuit arrangement as claimed in claim 6, wherein said full-wave rectifier comprises a multiphase rectifier and further comprising a third transformer having an input winding connected to the input winding of said first transformer and a plurality of secondary windings, a plurality of additional diodes each connected in series circuit arrangement with a corresponding one of the secondary windings of said third transformer, each of said series circuit arrangements being connected across a corresponding one of said diodes in opposition to the current flow through the corresponding diode.

10. A circuit arrangement as claimed in claim 6, wherein said full-wave rectifier comprises a single phase rectifier and further comprising a third transformer having an input winding connected to the input winding of said first transformer and a plurality of secondary windings, a plurality of additional diodes each connected in series circuit arrangement with a corresponding one of the secondary windings of said third transformer, each of said series circuit arrangements being connected across a corresponding one of said diodes in opposition to the current flow through the corresponding diode.

References Cited

UNITED STATES PATENTS

| | | | |
|---|---|---|---|
| 2,759,142 | 7/1956 | Hamilton | 321—24 |
| 2,864,047 | 12/1958 | Greene et al. | 321—16 |
| 2,874,346 | 2/1959 | Orvis | 321—18 |
| 2,896,147 | 7/1959 | Huge | 321—16 |
| 3,113,259 | 12/1963 | Walker | 321—24 |
| 3,129,375 | 4/1964 | Huntzinger | 321—16 |

JOHN F. COUCH, *Primary Examiner.*

M. L. WACHTELL, *Assistant Examiner.*

Disclaimer 3,335,356.—*Earl C. Rhyne, Jr.*, Millis, Mass. CONTROL CIRCUIT FOR POWER RECTIFYING SYSTEMS. Patent dated Aug. 8, 1967. Disclaimer filed Oct. 3, 1968, by the inventor; the assignee, *Sola Basic Industries, Inc.*, assenting.

Hereby enters this disclaimer to claims 1–8 of said patent.

[*Official Gazette March 11, 1969.*]